US010293765B2

(12) United States Patent
Csabai et al.

(10) Patent No.: US 10,293,765 B2
(45) Date of Patent: May 21, 2019

(54) CONTROL ELECTRONICS FOR AN AGRICULTURAL OR FORESTRY VEHICLE

(71) Applicant: Continental Automotive GmbH, Hannover (DE)

(72) Inventors: Peter Csabai, Vienna (AT); Christian Fleischer, Vienna (AT)

(73) Assignee: Continental Automotive GmbH, Hannover (DE)

( * ) Notice: Subject to any disclaimer, the term of this patent is extended or adjusted under 35 U.S.C. 154(b) by 285 days.

(21) Appl. No.: 15/292,671

(22) Filed: Oct. 13, 2016

(65) Prior Publication Data

US 2017/0106815 A1    Apr. 20, 2017

(30) Foreign Application Priority Data

Oct. 14, 2015  (DE) .......................... 10 2015 219 970
Nov. 30, 2015  (DE) .......................... 10 2015 223 626

(51) Int. Cl.
| | |
|---|---|
| *H02J 13/00* | (2006.01) |
| *B60R 16/023* | (2006.01) |
| *A01B 76/00* | (2006.01) |
| *A01G 23/00* | (2006.01) |
| *B60D 1/62* | (2006.01) |

(52) U.S. Cl.
CPC ............ *B60R 16/023* (2013.01); *A01B 76/00* (2013.01); *A01G 23/00* (2013.01); *B60D 1/62* (2013.01); *H02J 13/002* (2013.01)

(58) Field of Classification Search
CPC ......... B60R 16/00; A01B 76/00; A01G 23/00; B60D 1/00; H02J 13/00
USPC ........................................... 307/9.1
See application file for complete search history.

(56) References Cited

U.S. PATENT DOCUMENTS

2010/0141029 A1* 6/2010 Heger .................. H02J 1/08
                                                307/9.1

FOREIGN PATENT DOCUMENTS

DE   102011121577 A1   6/2013
DE   102011121580 A1   6/2013

* cited by examiner

*Primary Examiner* — Rexford N Barnie
*Assistant Examiner* — Joseph N Inge

(57) ABSTRACT

Control electronics for an agricultural or forestry vehicle or machine having power connections at least for a first supply network and a second supply network and having at least one network connection, the control electronics comprising a communication circuit configured to transmit data via the network connection and supplied via the first supply network; a logic circuit coupled to the communication circuit, the logic circuit having at least one control output for controlling an electrical load supplied via the second supply network, the logic circuit being connected to the second supply network via an internal supply line and an internal ground line and configured to be supplied via the second supply network, and an isolating switch arranged in the internal supply line or the internal ground line of the logic circuit and configured to interrupt the logic circuit if the second supply network is interrupted.

16 Claims, 7 Drawing Sheets

CONTROL ELECTRONICS FOR AN AGRICULTURAL OR FORESTRY VEHICLE

BRIEF DESCRIPTION OF THE DRAWINGS

The invention is explained in detail below using a particularly preferred exemplary embodiment, to which the invention is not intended to be restricted however, and with reference to the following drawings.

DETAILED DESCRIPTION

Figure 1:
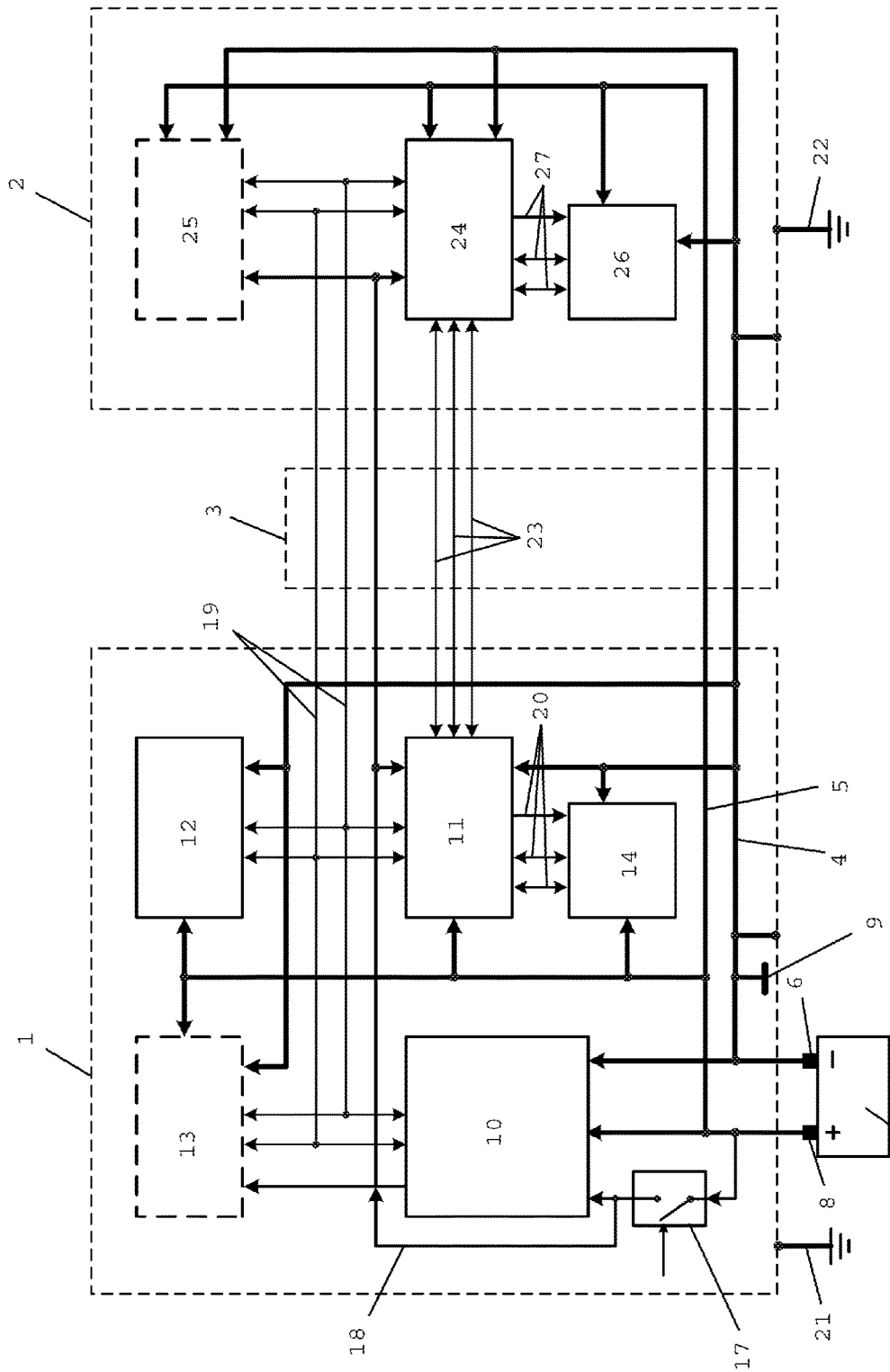
FIG. 1 shows a schematic block diagram of a currently conventional system structure in an agricultural application.

The invention relates to control electronics for an agricultural or forestry vehicle or an agricultural or forestry machine, having power connections at least for a first supply network and a second supply network and having at least one network connection, which control electronics contain a communication circuit, which is set up to transmit data via the network connection and is supplied via the first supply network, and a logic circuit, which is coupled to the communication circuit and has at least one control output for controlling an electrical load supplied via the second supply network, and to a method for switching on such control electronics, that is to say for switching on the power supply for the control electronics.

For the purpose of ensuring low susceptibility to interference in the communication between the electronic control units (ECU) mounted on an agricultural or forestry tractor or its trailer, modern bus systems for agricultural and forestry vehicles and machines (for example the ISO 11783 standard, "ISOBUS") stipulate the implementation of a communication system (for example in the form of a bus system) with potential-free supplies (for example via a nine-wire bus connection for ISOBUS) with the following properties:

the use of a two-wire communication network (for example a CAN network) appropriate only for this purpose and the associated communication sequences;

the use of a three-wire bus termination network (terminating bias circuit, TBC) which ensures that, if a mating part is not connected to a connection intended to extend the CAN bus, the bus is terminated properly and reflections of the data signals are therefore suppressed;

the use of two DC-isolated supply networks, one of which (for example "PWR" and "GND" in ISO 11783—up to a maximum current intensity of 50 amperes) is intended for loads and actuators and the other of which (for example "ECU_PWR" and "ECU_GND" in ISO 11783—up to a maximum current intensity of 15 amperes) is intended for the logic part of the individual ECUs, which also electrically includes the above-mentioned communication network (CAN network); not only (purely theoretical) complete electrical isolation but also isolation with a defined isolation impedance are generally referred to as DC isolation here;

the two supply networks are intended to have a defined first minimum isolation impedance (for example at least 1 Mohm in ISO 11783) on the tractor (in a tractor ECU, also TECU) and on the trailer (or "implement") and are intended to have a defined second minimum isolation impedance (for example at least 5 Mohm in ISO 11783) in the system bus ("implement bus") and are intended to be combined at only one location (for example at the negative pole of a battery) on the tractor in this case; or in more detail:

the ground lines (GND and ECU_GND) of the two supply networks converge at a single point (at the negative pole of the battery) only on the tractor side. For the purpose of avoiding ground loops, the DC isolation of the two supply networks is required on the trailer side (on the implement). A minimum impedance between GND and ECU_GND of 5 Mohm is also required on the trailer side if an ECU is not connected to the bus;

ECUs which are connected to such a communication bus are intended to have a minimum impedance of 1 Mohm between their GND and ECU_GND connections.

In a system equipped with this type of DC isolation (for example according to ISOBUS), a so-called main ECU (also tractor ECU or TECU for short) acts as a coordinator and monitor of the system bus functionality and ensures that an ignition signal (also terminal_15 signal) is transmitted to all ECU controllers connected to the system bus (ISOBUS) when the vehicle key is at the ON position; the transmission can be carried out via the power supply itself or via the system bus; and the ignition signal (terminal_15 signal) for all ECU controllers connected to the system bus (ISOBUS) remains activated for a certain minimum duration (for example at least an additional two seconds) after the vehicle key has been turned to the OFF position.

A TECU connected to an ISOBUS, for example, is also intended to be able to act as a gateway, that is to say as a communication interface between the communication network and an ECU which is not incorporated in the communication network, for example does not comply with the standards, and is part of the overall system.

In the case of control electronics for an electronic control unit (ECU) which meets the above requirements, DC isolation is therefore required between the communication network, on the one hand, and the ECU logic part (for example the logic circuit) and the connected power components, on the other hand, that is to say the communication network and the power components are potential-free among one another. Such isolation is usually achieved by transmitting the control signals for the power components via DC-isolated couplings. Such coupling can be achieved optically, magnetically, capacitively or by radio connection, for example. In any case, such a solution is associated with a considerable amount of effort and corresponding costs on account of the number of signal paths to be isolated.

One object of the invention is to provide economic control electronics, that is to say control electronics which can be produced as cost-effectively as possible, which are set up to participate in a communication network and to control loads supplied via a supply network which is potential-free with respect to the communication network, the reference potential of the first supply network, called "ECU_GND", having an isolation impedance of at least 1 Mohm with respect to the reference potential of the second supply network, called "GND".

In the case of control electronics of the type cited at the outset, this object is achieved by virtue of the fact that at least one first bridging element is set up to connect the first supply network to the second supply network, the first bridging element being substantially electrically insulating in an off state and being substantially electrically conductive in an on state, with the result that the two supply networks have at least a stipulated minimum isolation impedance in the off state of the at least one first bridging element.

The invention is based on the knowledge that the freedom from potential is generally defined and required or necessary only in the switched-off or zero-voltage state of the system, that is to say the vehicle, the machine or the "implement", and in the case of control electronics isolated from a system bus. In this state, the first bridging element is in the off state, with the result that the two supply networks are at least isolated by the minimum isolation impedance. In the switched-on state of the system, the first bridging element can be at least temporarily changed to an on state, with the result that the DC isolation is temporarily canceled and a—comparatively cost-effective—electrically conductive connection is therefore established between the communication network, the logic circuit and the control of the loads and the electrical loads. The control signals can therefore be coupled via one or more electrically conductive connections, which considerably reduces the complexity and the production costs of the control electronics.

The first bridging element may preferably be a first bypass switch, the off state being a switched-off or open state of the first bypass switch. A bypass switch makes it possible to isolate the two supply networks in the switched-off or off state, which is substantially independent of the applied voltage.

If the bypass switch is a MOSFET, that is to say a metal oxide semiconductor field-effect transistor, high isolation impedances can also be achieved in a cost-effective manner. In this context, the use of a p-type MOSFET, which generally has a higher isolation impedance than comparable n-type switches, is particularly favorable. It goes without saying, however, that all MOSFET types can be used in principle for the bypass switch, any advantages and disadvantages depending, in particular, on the design of the circuit.

In one particularly favorable variant, the first bridging element comprises at least one first bridging diode and the off state of the first bridging element corresponds to operation of the at least one first bridging diode in the reverse direction, the first bridging diode connecting the first supply network to the second supply network in the forward direction. A bridging diode is considerably more cost-effective to produce than a switch. In addition, there is no need for isolated control of the diode. The bridging diode assumes an on state only in the case of an applied voltage above a forward voltage in the forward direction. In the case of a voltage in the reverse direction or below the forward voltage, in particular in a zero-voltage state, the bridging diode remains in an off state. Accordingly, the minimum isolation impedance between the supply networks is complied with in the case of a measurement voltage below the forward voltage. The forward voltage may possibly be determined in a suitable manner by means of a series circuit comprising a plurality of bridging diodes.

It is also advantageous if the stipulated minimum isolation impedance between the reference potentials of the two supply networks is at least 1 Mohm. With this minimum isolation impedance, the control electronics meet the relevant requirements of the international ISO 11783 standard for the electronics on the towing device and on the implement. The stipulated minimum isolation impedance, measured on the system bus and in the case of control electronics isolated from a system bus, can preferably be at least 5 Mohm, which complies with the specifications of ISO 11783 for the system bus (implement bus).

In addition, it has been found to be favorable if at least one load switch is connected downstream of the at least one control output of the logic circuit. In this manner, all control outputs of the logic circuit are DC-isolated from the loads being controlled and from the second supply network supplying them in the switched-off state of the system when the load switch is open (or—in the case of a plurality of load switches—if all load switches are open). The logic circuit can therefore be supplied via the first supply network. In this case, the logic circuit is arranged in the same supply network as the communication circuit and can therefore be directly connected to the latter in an electrically conductive manner. In the switched-on state, the load switch (or the load switches) is closed and the control signals can be transmitted, via the load switch(es), to the controlled loads in the second supply network using the electrically conductive connections.

Alternatively, and according to one preferred embodiment, the logic circuit can be supplied via the second supply network, the first bridging element being connected between the connection for the first supply network and the logic circuit, with the result that the logic circuit is set up to be temporarily supplied via the first supply network. In this case, the logic circuit is arranged in the same supply network as the loads to be controlled and can therefore be directly connected to the latter in an electrically conductive manner. That is to say, the DC reference potential isolation is set to the interface level between the communication circuit and the logic circuit of the ECU, where a considerably smaller number of DC-isolated couplers needs to be fitted than in the case of DC isolation at the interface level between the logic circuit of the ECU and the individual circuit breakers. Therefore, in the simplest case, only one bridging element, namely between the connection for the first supply network and the logic circuit, is required for the DC isolation in the off state of the bridging element. Quite generally and independently of the use of a bridging element, it is advantageous, in the case of control electronics of the type cited at the outset, if DC isolation is provided between the communication circuit and the logic circuit because coupling can be provided at this location with comparatively little effort.

In connection with such control electronics and in accordance with the method according to the invention of the type cited at the outset, the first supply network is connected to a voltage supply after an ignition signal from an agricultural or forestry vehicle or an agricultural or forestry machine, which ignition signal is used to initiate a starting operation, the first bridging element of the control electronics is changed to an on state (that is to say a bypass switch is closed or a voltage above the forward voltage in the forward direction is applied to the bridging diode) in a manner triggered by the voltage in the first supply network, and the logic circuit is temporarily supplied via the first supply network, the supply is then confirmed by the logic circuit via the communication circuit and the network connection, and the second supply network is then connected to a voltage supply. On account of the temporary supply via the first supply network, which is generally first supplied with voltage, the logic circuit can participate in initialization of the control electronics of the system which are connected to the communication network, which initialization takes place before the second supply network is activated. The logic circuit can therefore already transmit data via the network connection before a voltage is applied to the second supply network. In this case, there is therefore no need for a separate logic circuit for initializing the communication network.

Furthermore, in connection with the control electronics which are described above and have a first bypass switch between the connection for the first supply network and the logic circuit, it is particularly advantageous if the first bypass switch is opened in a manner triggered by the voltage in the second supply network and the temporary supply of the logic circuit via the first supply network is terminated (any isolating switch—see below—remains closed, however). Therefore, the control electronics are set up to establish DC isolation again between the communication network and the communication circuit, on the one hand, and the electrical loads and the logic circuit, on the other hand, after an initialization or switch-on operation. In the case of a first bridging diode, the latter independently changes to an off state, in the event of a voltage in the second supply network which corresponds to the voltage in the first supply network, as soon as the voltage difference in the forward direction falls below the forward voltage of the bridging diode.

In order to additionally implement such DC isolation between the logic circuit and the communication circuit in the switched-on state, that is to say during operation of the system, the logic circuit can be coupled to the communication circuit via a transformer, a capacitor, an optocoupler, an optical waveguide or a relay. Such couplings make it possible to transmit signals and data without an electrically conductive connection between the participants. On account of the isolation between the two circuits, which is counterintuitive at first glance, instead of between the logic circuit and the loads to be controlled, which appears to be natural, only DC-isolated signal coupling is required, which signifies a considerable cost saving.

Another object of the invention is to protect the logic circuit from unforeseen discharge currents, which occur if the ground connection between the battery and the ECU is interrupted, via the second supply network of supplied inductive loads if the logic circuit is connected to the second supply network via a supply line and a ground line and is set up to be supplied via the second supply network.

In the case of control electronics of the type cited at the outset, this object is achieved by virtue of the fact that an isolating switch is arranged in the internal supply line or the internal ground line of the logic circuit and is set up to interrupt it if the second supply network is interrupted.

The isolating switch is advantageously arranged in the internal ground line of the logic circuit which connects the logic circuit to a ground line of the second supply network.

With regard to a fast response in the event of an interruption, it is favorable if the isolating switch is controllably connected to a monitoring circuit, the monitoring circuit being set up to determine a voltage difference between the ground lines of the two supply networks or a current flowing via the bridging element and to control the isolating switch to open as soon as a determined voltage difference or a determined current exceeds a predefined upper threshold value. The monitoring circuit measures and monitors the voltage difference or the current between the ground lines virtually continuously and can open the isolating switch immediately via the bridging element in the event of an interruption in the ground line of the second supply network and a resulting voltage difference or a resulting current.

The monitoring circuit can preferably be set up to control the isolating switch to close as soon as the determined voltage difference undershoots a predefined lower threshold value. As a result, the conventional supply of the logic circuit, as provided for a fully functioning operating state, can be restored.

If the isolating switch is opened, it is favorable if the logic circuit is set up to be temporarily supplied via the first supply network. The logic circuit can continue to be operated even in the fault event of an interruption in the second supply network and can forward a diagnostic message relating to the interruption via the communication circuit, for example.

As already explained in detail above in connection with the starting operation, it is also favorable for the fault event of an interruption in a supply network if at least one first bridging element is connected to the first supply network and to the second supply network and is set up to at least temporarily connect the two supply networks, the first bridging element being substantially electrically insulating in an off state and being substantially electrically conductive in an on state, the two supply networks having at least a stipulated minimum isolation impedance in the off state of the first bridging element. In this case, the minimum isolation impedance corresponds to the minimum isolation impedance already defined in more detail further above.

As also already explained in more detail with the respective advantages above, the first bridging element may be a first bypass switch, the off state being a switched-off or open state of the first bypass switch. Alternatively, the first bridging element may be a first bridging diode and the off state of the first bridging element may correspond to operation of the at least one first bridging diode in the reverse direction, the first bridging diode connecting the first supply network to the second supply network in the forward direction.

In particular, it is advantageous if the first bridging element connects a supply line of the first supply network to a supply line of the second supply network. If one of the supply lines is isolated, if the supply partially fails or during a starting operation, a supply from the respective other supply network can be ensured, the ground line generally being able to be used further. In the case of such a connection of the supply lines, it goes without saying that an isolating switch is not arranged between the logic circuit and the first bridging element but rather between the supply line of the second supply network and the first bridging element if it is arranged in the internal supply line.

As mentioned above for a starting operation or a fault, one object of the invention is, in principle, to make it possible for the control electronics to participate in a communication network without interruption as far as possible. In particular, data transmission by the logic circuit via the network connection is intended to be maintained even in the event of a fault, including the above-mentioned interruption in the ground line and subsequent opening of the isolating switch. In connection with such a temporary supply, it is favorable, in the case of inductive loads, for example, which can trigger high currents when the isolating switch is opened and if the ground line of the second supply network (to the ECU or to the logic circuit) is interrupted, if a second bridging element is connected to a ground line of the first supply network and to an internal ground line of the logic circuit and is set up to at least temporarily connect the two ground lines, the second bridging element being substantially electrically insulating in an off state and being substantially electrically conductive in an on state. In the case of such a connection of the ground lines, it goes without saying that an isolating switch is not arranged between the logic circuit and the second bridging element but rather between the second bridging element and the ground line of the second supply network if it is arranged in the internal ground line.

The second bridging element may preferably be a second bypass switch, the off state being a switched-off or open state of the second bypass switch. A second bypass switch makes it possible to isolate the two supply networks in the switched-off or off state, which is substantially independent of the applied voltage, for example a predefined measurement voltage (for example of 200 mV).

If the second bypass switch is controllably connected to the monitoring circuit and is set up to control the second bypass switch to close as soon as the determined voltage difference exceeds a predefined upper threshold value, the isolating switch preferably being controlled to open at the same time, it is advantageously possible to change over the supply of the logic circuit in a fast and automated manner while simultaneously protecting the logic circuit from unforeseen discharge currents.

In addition, it is advantageous if the monitoring circuit is additionally set up to control the second bypass switch to open as soon as the determined voltage difference undershoots a predefined lower threshold value, the isolating switch preferably being controlled to close at the same time, with the result that there is a return to normal operation, that is to say to a supply via the second supply network, at the next possible time and the load on the first supply network is relieved.

In one particularly favorable variant, the second bridging element can comprise at least one second bridging diode, the off state of the second bridging element corresponding to operation of the at least one second bridging diode in the reverse direction, and the second bridging diode connecting the internal ground line to the first supply network in the forward direction. With regard to the advantages of a second bridging diode, reference is made to the statements made above with respect to the first bridging diode which similarly apply here.

With regard to the isolation impedance which was explained above and is desired or else necessary in different situations, it is desirable if the two supply networks have at least a stipulated minimum isolation impedance in a switched-off state of the two bypass switches.

FIG. 1 schematically illustrates, in a simplified manner, the structure of control electronics for an agricultural application comprising a tractor 1, an implement 2 (for example a trailer) and a cable harness 3 for connecting the implement 2 to the tractor 1. The application has only a single supply network 4, 5 having a ground line 4 (or reference line) and a supply line 5. The ground line 4 is connected to the negative pole 6 of a battery 7 of the tractor 1 and the supply line 5 is connected to the positive pole 8 of the battery 7. The ground line 4 is also connected to the housing of the tractor 1 via a functional grounding means 9. The supply network 4, 5 supplies both a central electronic tractor control unit 10 and additional electronic control units 11, 12, 13 as well as a local control unit 14 on the tractor 1. The control units 10-14 are directly connected to the ground line 4, the housings of the control units 10-14 being able to be connected to the chassis of the tractor or trailer via functional grounding means.

The tractor control unit 10 is connected to an ignition switch 17, an ignition signal being transmitted via an ignition signal line 18 which is branched off from the supply line 5. Both the tractor control unit 10 and some of the further control units 11, 13 are connected to the ignition signal line 18 and are set up to receive an ignition signal when the ignition is activated. Alternatively, the ignition signal line 18 leads only to a first ECU and this ECU then distributes its own derived ignition signal to the other ECUs in the overall system. In addition, the control units 11, 12, 13 are connected to one another and to the tractor control unit 10 via a data network in the form of a two-wire CAN bus 19. The local control unit 14 is not directly connected to the CAN bus 19. Communication with the local control unit 14 is carried out via the control unit 11 which is directly connected to it via local communication connections 20 and the local ignition signal and is set up as a gateway.

In the structure illustrated, the housing of the tractor 1 is grounded in the same manner as the housing of the implement 2 via grounding means 21, 22.

The cable harness 3 comprises connecting lines for the supply network 4, 5, the ignition signal line 18, the CAN bus 19 and additional direct connecting lines 23 between the control unit 11 of the tractor and an electronic control unit 24 of the implement 2. Apart from this control unit 24, the implement 2 comprises a further optional electronic control unit 25 and a local control unit 26. The two control units 24, 25 are connected to the supply network 4, 5, the ignition signal line 18 and the CAN bus 19. The local control unit 26 of the implement 2 is not connected to the CAN bus 19, but rather is directly connected, via local communication connections 27 and the local ignition signal, to the control unit 24 which acts as a gateway for the local control unit 26. In addition, the ground line 4 in the implement 2 is connected to the housing of the latter.

The control units 10, 11, 12, 13, 24, 25 can be activated by the ignition signal. As an alternative to the illustrated direct connection to the ignition switch 17, the ignition signal can also be received only by one control unit and can be forwarded to the other control units, as illustrated for the (local) control units 14, 26.

Figure 2:
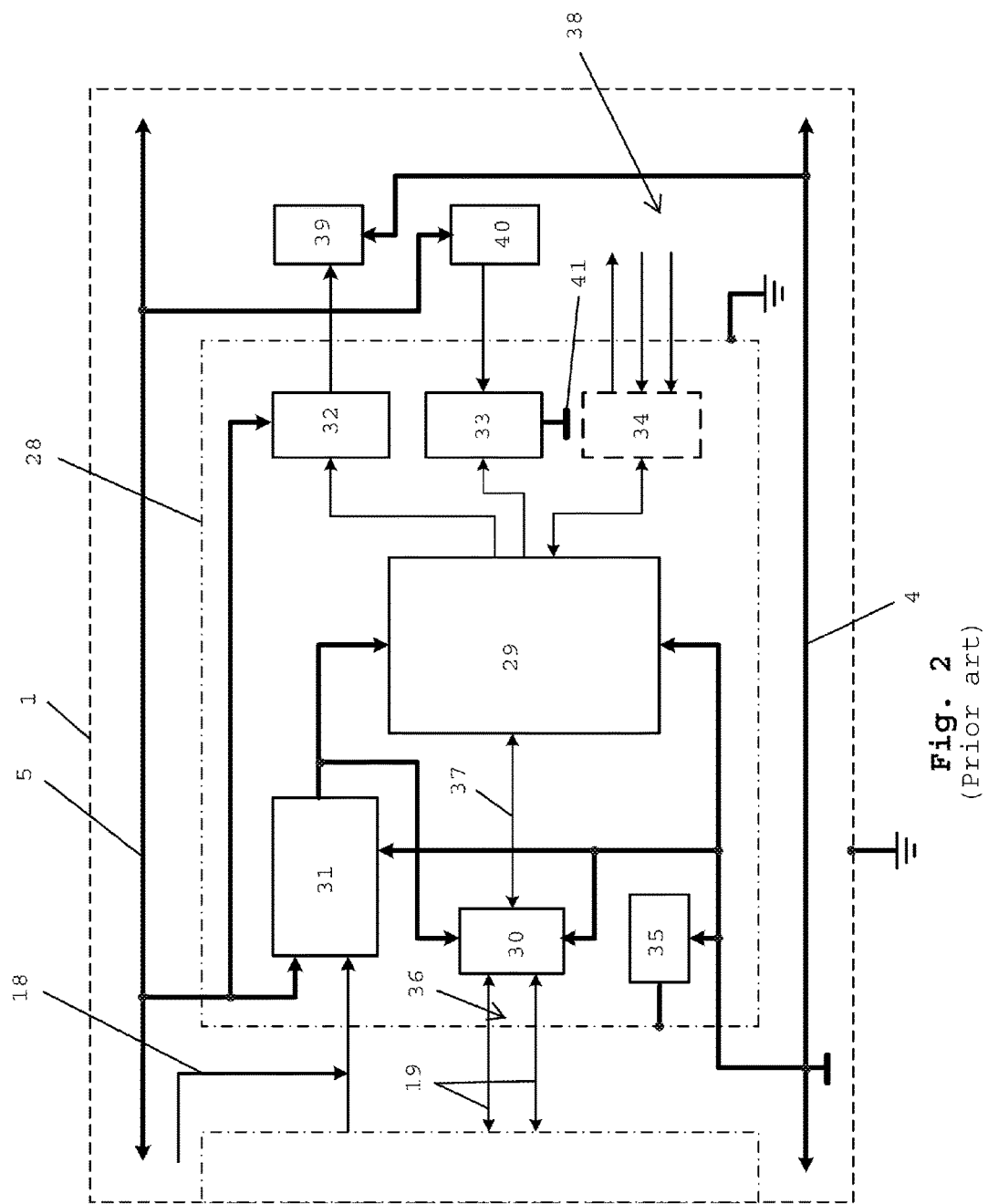
FIG. 2 shows a schematic block diagram of the electronic control unit according to FIG. 1 in more detail.

FIG. 2 illustrates a control unit 28 in the style of the control units 11, 12, 13, 14, 24 or 25 according to FIG. 1 in more detail. The control unit 28 illustrated comprises control electronics which contain a logic circuit 29, a communication circuit 30, a supply circuit 31, two driver circuits 32, 33, an optional local communication circuit 34 and a protective circuit 35. The supply circuit 31 of the control electronics or control unit 28 is connected to the supply line 5 of the tractor 1 (see FIG. 1) and supplies both the logic circuit 29 and the communication circuit 30 with current. The logic circuit 29 and the communication circuit 30 are in turn connected to the ground line 4 of the tractor 1. They are consequently supplied with current via the supply network 4, 5 of the tractor 1. The driver circuits 32, 33 are directly incorporated in the supply network 4, 5. The supply circuit 31 is connected to the ignition signal line 18 of the tractor 1 and is set up to supply the logic circuit 29 and the communication circuit 30 with current only when an ignition signal is applied. The communication circuit 30 is connected to the CAN bus 19 of the tractor 1 via a network connection 36 and is set up to transmit data via the network connection 36 and the CAN bus 19. The communication circuit 30 is internally electrically connected to the logic circuit 29 via a local signal line 37; the same applies to the signal connections between the logic circuit 29 and the driver circuits 32, 33 and the optional local communication circuit 34 which moreover provides, to the outside, a local network connection 38 for connecting at least one local control unit.

Loads 39, 40 are connected to the driver circuits 32, 33 and are connected to the supply line 5 and/or the ground line 4. In detail, the load 39 is supplied via the driver circuit 32 and is connected to the ground line 4. The load 40 is directly supplied via the supply line 5 and is connected to the functional ground 41 via the driver circuit 33. In practice, the driver circuit 33 is directly connected to the ground line 4 in the control device, the illustration shown being used only for clarity.

The control unit 28 is activated via an ignition signal on the ignition signal line 18. The ignition signal can also be used to supply the logic part, that is to say the logic circuit 29 and the communication circuit 30, in which case a stipulated load current must not be exceeded. In the control electronics illustrated in FIG. 2, the communication circuit 30 and therefore the communication interface provided, that is to say the CAN bus, are generally fed via the supply network. In particular, the reference of the bus signals on the CAN bus is the common ground line 4. An ESD protective circuit 35 may be optionally provided in order to protect the components. Such a protective circuit 35 is expedient, in particular, when special protective treatment of the control unit 28 or of the tractor 1 or the implement 2 is intended to be carried out, for example in the case of static charging during electrostatic painting.

The systems illustrated in FIG. 1 and FIG. 2 have only a single supply network and therefore naturally cannot provide any potential-free supply networks. As a result, they do not meet the requirements in the relevant standards (see introduction), for example. In particular, crosstalk from the supply of the loads to the communication network cannot be effectively suppressed here.

Figure 3:
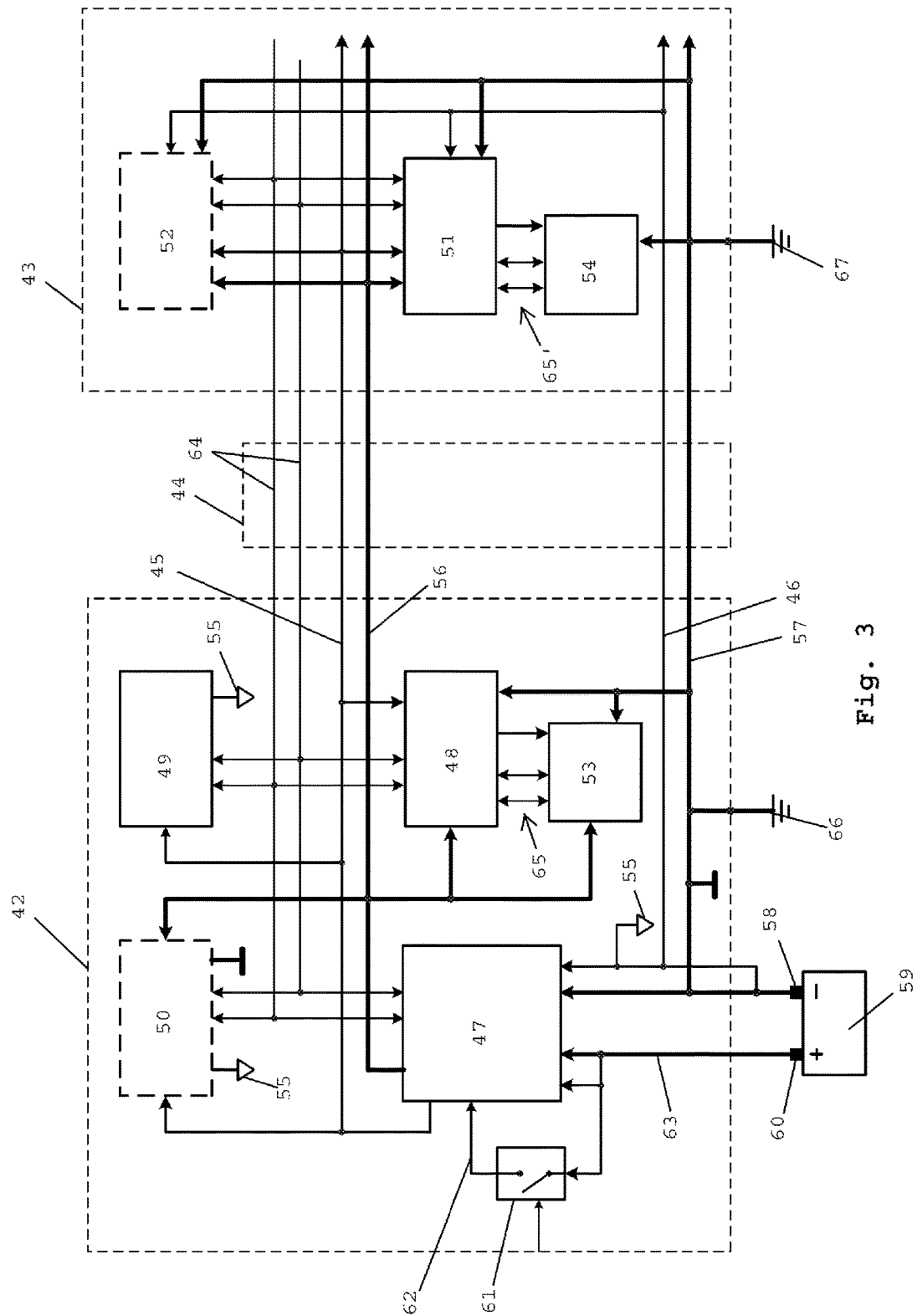
FIG. 3 shows a schematic block diagram of a system structure in an agricultural application with supply networks which are potential-free among one another.
Figure 4:
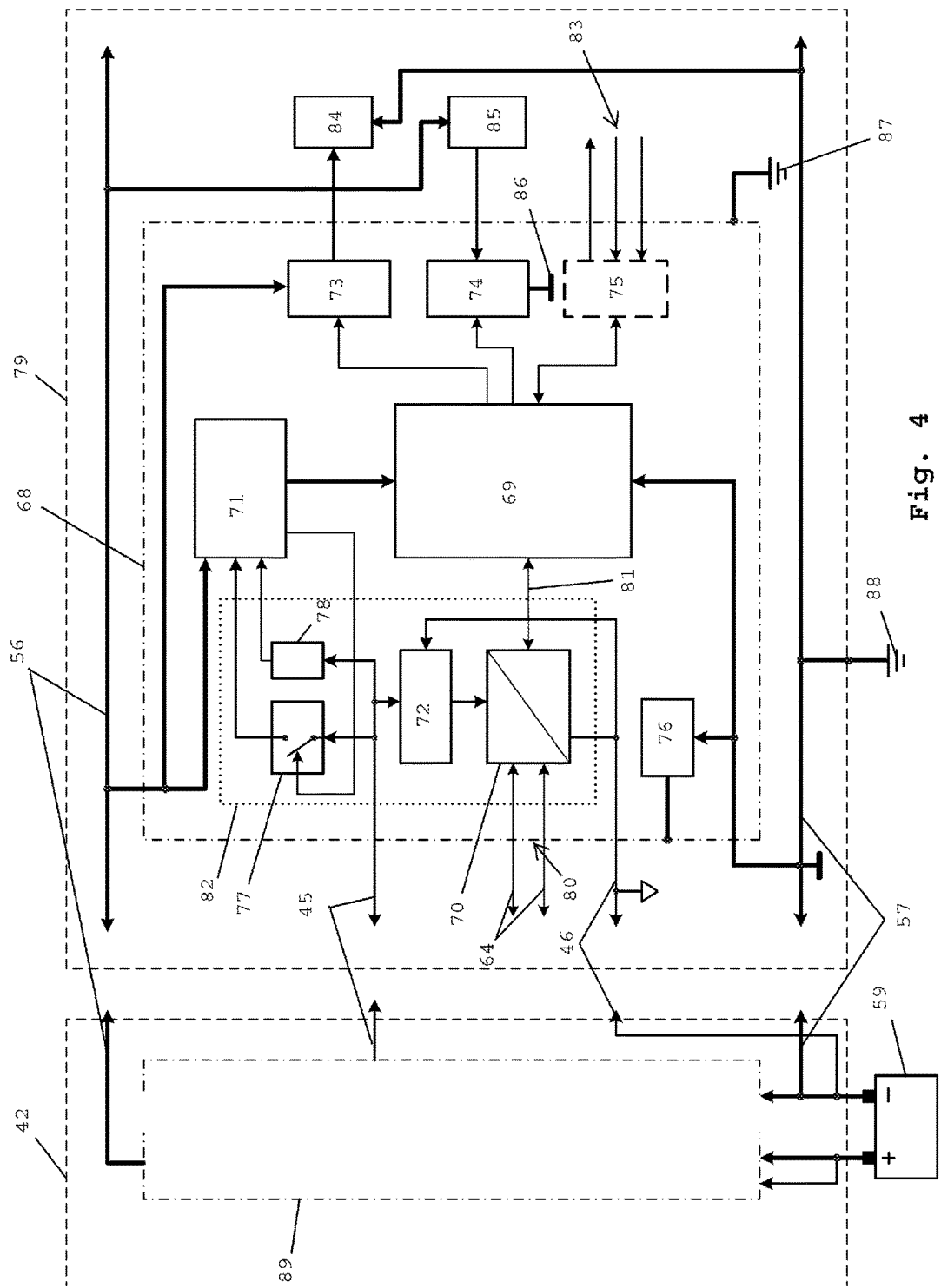
FIG. 4 shows a schematic block diagram of the electronic control unit according to FIG. 3 in more detail and in accordance with the present control electronics without a monitoring circuit.

In contrast, FIGS. 3 and 4 show a preferred application and embodiment of the present control electronics. FIG. 3 schematically illustrates, in a simplified manner, the structure of control electronics of an agricultural application comprising a tractor 42, an implement 43 (for example a trailer or an attachment) and a cable harness 44 for connecting the implement 43 to the tractor 42. The architecture shown conforms to the ISOBUS because the entire voltage supply has an isolated structure.

Specifically, the application according to FIG. 3 has a first supply network 45, 46 which comprises a supply line 45 fed by a central electronic tractor control unit 47 and a separate ground line 46 and is set up to supply energy to additional control units 48, 49 and an optional control unit 50 on the tractor 42 and to the control unit 51 as well as the optional control unit 52 on the implement 43. Local control units 53 and 54 on the tractor 42 and on the implement 43, respectively, which do not conform to the ISOBUS are not connected to the first supply network 45, 46. In this structure, the supply line 45 of the first supply network 45, 46 takes the place of the ignition signal line 18 according to FIGS. 1 and 2. The ground line 46 of the first supply network 45, 46 is formed by an additional line in comparison with the previously shown system (FIGS. 1 and 2). For the purpose of better clarity, some control units 49, 50 are not directly connected to the ground line 46 of the first supply network 45, 46, but rather the connection is illustrated as an equipotential 55. In practice, all control units which conform to the ISOBUS are always directly connected to the ground line 46; the illustration shows only a diagrammatic simplification.

The application also has a second supply network 56, 57 which comprises a supply line 56 and a ground line 57 and is set up to supply the control units 47, 48 and 50-52 (the additional control unit 49 has no loads to control and is therefore connected only to the first supply network) and the local control units 53, 54. The ground line 46 of the first supply network 45, 46 is DC-isolated from the ground line 57 of the second supply network 56, 57, with the exception of a connection point at the negative pole 58 of a battery 59 of the tractor 42, the isolation impedance for the control devices on the tractor 42 and on the implement 43 being greater than 1 Mohm, and the isolation impedance between the ground lines 46, 57, measured on the system bus (implement bus) in the zero-voltage state and without connected control electronics, being greater than 5 Mohm. The supply line 56 of the second supply network 56, 57 is connected to the positive pole 60 of the battery 59 via the tractor control unit 47 and the common supply line 63. The tractor control unit 47 is connected to an ignition switch 61, an ignition signal being transmitted via an ignition signal line 62 which is branched off from the common supply line 63. The control units 48-52 are also connected to one another and to the tractor control unit 47 via a data network in the form of a two-wire CAN bus 64. The local control units 53, 54 are not connected to the CAN bus 64, but rather are set up to communicate via one of the control units 48 or 51 and are directly connected to the respective control unit 48 or 51 via local control lines 65, 65', with the result that the control units 48, 51 act as a gateway. In the structure illustrated, the housing of the tractor 42 is grounded in the same manner as the housing of the implement 43 via grounding means 66, 67.

The implement 43 is connected to the tractor 42 via the cable harness 44. The cable harness 44 comprises connecting lines for the first supply network 45, 46, the second supply network 56, 57 and the CAN bus 64. It goes without saying that additional connecting lines may be provided.

Upon activation of the ignition, the tractor control unit 47 establishes a supply voltage in the first supply network 45, 46 by connecting the supply line 45 of the first supply network 45, 46 to the central supply line 63. The control units 48-52 supplied via the first supply network 45, 46 are activated thereby and confirm the voltage supply established via the first supply network 45, 46 via the CAN bus 64. The tractor control unit 47 then establishes a supply voltage in the second supply network 56, 57 by connecting the supply line 56 of the second supply network 56, 57 to the central supply line 63.

FIG. 4 illustrates in more detail control electronics according to the invention having a control unit 68 in the style of the control units 48-52 according to FIG. 3 with the omission of the cable harness 44. The control unit 68 illustrated comprises control electronics which contain a logic circuit 69, a communication circuit 70, a central supply circuit 71, a local supply circuit 72, two driver circuits 73, 74, an optional local communication circuit 75, a protective circuit 76, a first bypass switch 77 and a voltage detector 78. The central supply circuit 71 of the control electronics is connected to the supply line 56 of the second supply network 56, 57 of the application 79, that is to say of the tractor 42 or the implement 43, and supplies the logic circuit 69 with current. The logic circuit 69 is in turn connected to the ground line 57 of the second supply network 56, 57 of the application 79. It is consequently supplied with current via the second supply network 56, 57 of the tractor 42 via the tractor control unit 47 and the battery 59 of said tractor. The driver circuits 73, 74 are directly incorporated in the second supply network 56, 57.

The central supply circuit 71 is additionally connected to the supply line 45 of the first supply network 45, 46 of the tractor 42 via the first bypass switch 77 and is set up to supply the logic circuit 69 with current from the first supply network 45, 46 when the bypass switch 77 is closed.

The local supply circuit 72 of the control electronics is connected to the supply line 45 of the first supply network 45, 46 of the application 79 and supplies the communication circuit 70 with current. The communication circuit 70 is in turn connected to the ground line 46 of the first supply network 45, 46 of the application 79. It is consequently supplied with current via the first supply network 45, 46 of the tractor 42. The communication circuit 70 is connected to the CAN bus 64 of the tractor 42 via a network connection 80 and is set up to transmit data via the network connection 80 and the CAN bus 64. The communication circuit 30 is internally coupled to the logic circuit 69 in a DC-isolated manner via a local signal connection 81.

The coupling is signal coupling between the circuits 69, 70 of the control electronics which are DC-isolated when the bypass switch 77 is open. The coupling is preferably established via an optocoupler. The communication circuit 70, the local supply circuit 72, the first bypass switch 77 and the voltage detector 78 therefore form a region 82 of the control electronics which is isolated from the logic circuit 69 and the driver circuits 73, 74 with a defined isolation impedance when the bypass switch 77 is open. The connections between the logic circuit 69 and the driver circuits 73, 74 and the local communication circuit 75, which provides, to the outside, a local network connection 83, for example for connecting at least one local control unit, are conductive electrical connections.

Electrical loads 84, 85, for example electrical actuators or lighting devices, are connected to the driver circuits 73, 74 and are connected to the supply line 56 and/or the ground line 57 of the second supply network 56, 57. In detail, one load 84 is supplied via the driver circuit 73 and is connected to the ground line 57 of the second supply network 56, 57. The other load 85 is directly supplied via the supply line 56 and is connected to functional ground 86 via the driver circuit 74.

Since, in the control electronics illustrated in FIG. 4, the communication circuit 70 and therefore the communication interface provided, that is to say the CAN bus 64, are fed via the first supply network 45, 46, the reference of the bus signals on the CAN bus 64 is the ground line 46 of the first supply network 45, 46. Crosstalk of signals from the loads 84, 85 to the CAN bus 64 can be excluded or at least greatly attenuated because the loads 84, 85 are related to the DC-isolated ground line 57 of the second supply network 56, 57. This makes it possible to reduce interference in the communication network. The ESD protective circuit 76 may be optionally provided in order to protect the components. As mentioned, such a protective circuit 76 is expedient, in particular, when special treatment of the control unit 69 or the application 79 is carried out, for example static charging during electrostatic painting. The protective circuit 76 is connected, together with the control unit 68, to the grounding means 87. The ground line 57 of the second supply network 56, 57 is grounded via the housing of the application 79 and the grounding means 88. The control electronics 89 of the tractor 42 are only indicated in FIG. 4, in which case reference is made to the statements made in connection with FIG. 3, in particular the tractor control unit 47 described there, for more details.

As already indicated above, activation of the ignition, cf. FIG. 3, results in the control electronics of the connected control unit 68 according to FIG. 4 being switched on. In this case, a voltage applied to the first supply network 45, 46 is detected by the voltage detector 78 and a corresponding signal is forwarded to the central supply circuit 71. The central supply circuit 71 then closes the bypass switch 77 and, as a result, establishes a temporary supply of the logic circuit 69 via the supply line 45 of the first supply network 45, 46 and the ground line 57 of the second supply network 56, 57. The communication circuit 70 is fed by the supply line 45 and the ground line 46 of the first supply network 45, 46. The logic circuit 69 supplied in this manner confirms its supply via the local signal line 81 and the communication circuit 70, that is to say by transmitting a corresponding notification on the CAN bus 64. As soon as the supply in the second supply network 56, 57 is established, the central supply circuit 71 detects this and opens the bypass switch 77. From this time on, the logic circuit 60 is supplied via the second supply network 56, 57 and is DC-isolated from the communication circuit 70 and the CAN bus 64. The central supply circuit 71 is also set up, in the event of temporary failures of the supply in the second supply network 56, 57, to close the bypass switch 77 again for the duration of the failure and to therefore ensure that the logic circuit 69 is supplied without interruption. The same applies to a stipulated period, for example two seconds, after the ignition has been switched off, during which the supply in the second supply network 56, 57 has already been terminated and the supply in the first supply network 45, 46 is maintained.

While the bypass switch 77 is closed, although the DC isolation between the supply networks is canceled, the bypass switch 77 is closed substantially only during those periods in which a voltage is not applied to the second supply network 56, 57 in the preferred embodiment described above. That is to say, the loads supplied exclusively via the second supply network 56, 57 naturally cannot be supplied in this period and therefore cannot be operated and crosstalk to the CAN bus consequently also cannot occur.

In this exemplary embodiment, the bypass switch 77 is a p-type MOSFET with an impedance in the switched-off state of 5 or 10 Mohm, for example. The requirements of ISO 11783 are therefore met in the case of the control electronics shown by virtue of the fact that the bypass switch 77 is open in any case in the zero-voltage state of the system and the minimum isolation impedance between the supply networks, that is to say, in particular, between the ground lines 46, 57 of the supply networks, is therefore complied with.

FIG. 5 again represents the control electronics according to FIG. 4, in which case the same reference numerals were respectively used for the same elements. Three independent fault events of a line interruption are depicted here on the basis of the control electronics which have already been described. If the power supply collapses on account of an interruption in the supply line 56, there is still the ground connection of the logic circuit 69 which is established via the ground line 57 to the power supply. The interruption is detected by the logic circuit 69 and the logic circuit 69 is connected to the supply line 45 of the first supply network 45, 46 via the first bypass switch 77 and the central supply circuit 71. This ensures that the logic circuit 69 is supplied and ensures continuous communication via the network connection 80, as required by the ISOBUS standard.

However, if the connection to the power ground (GND) breaks at particular locations 90, 91, 92, the logic circuit 69 is no longer supplied under certain circumstances in the case of the control electronics illustrated, with the result that the supply of the power parts can no longer be maintained. In this case, there are three different scenarios in which communication is intended to be maintained:

a) interruption in the ground line of the power supply between the control unit 68 and the ground line 57 of the application 79;

b) interruption in the ground line 57 of the power supply between the application 79 and the tractor 42; and c) interruption in the ground line 57 of the power supply of the application between the control unit 68 and downstream control devices and loads, the control unit 68 remaining connected to the ground line 57 and the ground of the battery 59.

Figure 5:
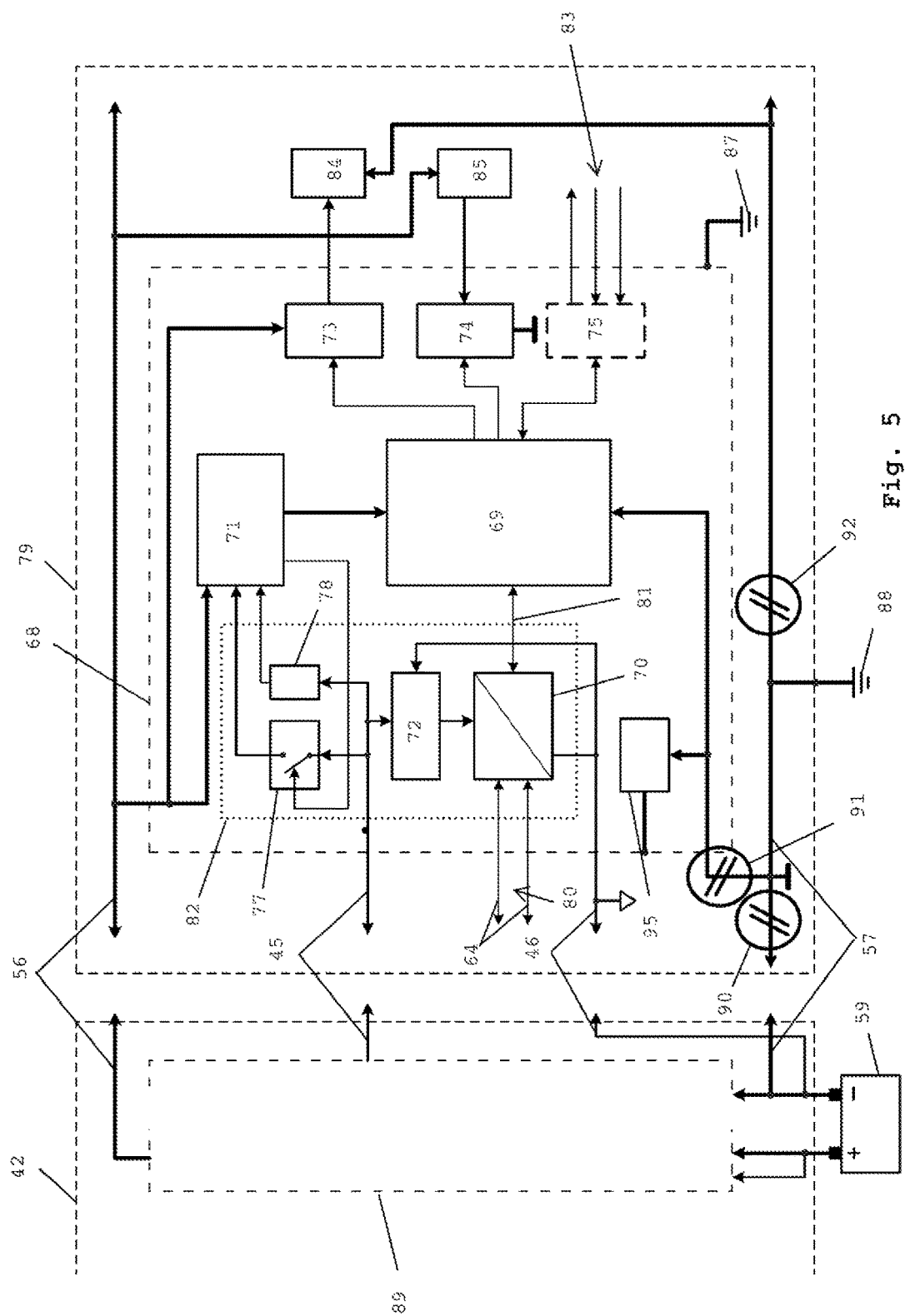
FIG. 5 shows the block diagram according to FIG. 4 with a few interruptions in the ground connections of a supply network which are indicated by way of example.

The first scenario a) corresponds to an interruption at the location 91 in FIG. 5; the second scenario b) corresponds to an interruption at the location 90; the third scenario c) corresponds to an interruption at the location 92. As is clear from the circuit diagram, in the case of the circuit according to FIG. 5, the first two interruption scenarios a) and b) result in a failure of the supply of the logic circuit 69 because the logic circuit 69 is supplied only via the ground line 57. In contrast, the third scenario c) does not result in such a failure and is therefore not explained in any more detail below.

Figure 6:
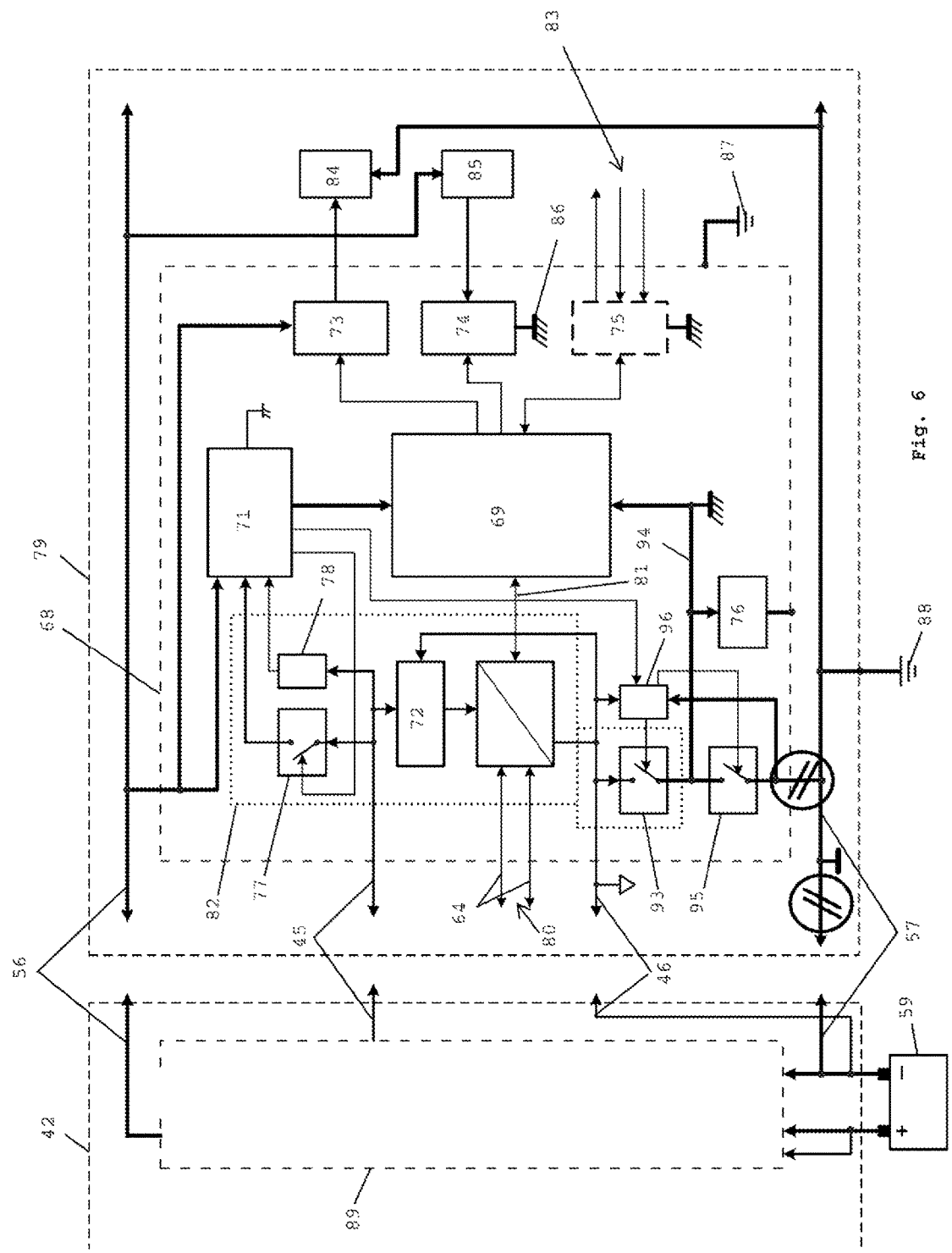
FIG. 6 shows a schematic block diagram of an expanded electronic control unit with protection of the logic circuit from discharge currents and for maintaining the supply for communication if the ground connections of a supply network are interrupted.

The failures in scenarios a) and b) are avoided with the control electronics illustrated in FIG. 6. In comparison with the circuit according to FIGS. 4 and 5, a second bypass switch 93 was inserted between the internal ground line 94 of the control unit 68 and the ground line 46 of the first supply network (45, 46) and an isolating switch 95 was inserted between the ground line 57 of the second supply network (56, 57) and the internal ground line 94 of the control unit 68. The second bypass switch 93 and the isolating switch 95 are controllably connected to a monitoring circuit 96, that is to say the logic outputs of the monitoring circuit 96 are connected to the control inputs of the two switches 93, 95 for the purpose of controlling the switch states. The monitoring circuit 96 has at least two measurement inputs which are connected to the ground line 46 of the first supply network (45, 46) and to the ground line 57 of the second supply network (56, 57) between the isolating switch 95 and the control device connection on the cable harness of the application 79. The monitoring circuit 96 measures and monitors the voltage difference between the two measurement inputs and the connected ground lines 46, 57 and controls the switches 93, 95 on the basis of the voltage difference determined.

In the normal operating state, that is to say when all connections of the two supply networks exist (there is therefore no voltage difference between the grounds), the isolating switch 95 is closed and the second bypass switch 93 is open and the logic circuit 69 of the control unit 68 is therefore connected to the ground line 57 of the second supply network (56, 57). This corresponds to the configuration in the circuits according to FIGS. 3 and 4. If the first supply network 45, 46 is supplied with current during a starting operation, the communication circuit 70 is supplied as usual and the logic circuit 69 of the control unit 68 is supplied via the first supply network 45, 46 and the central supply circuit 71 and the logic circuit 69 is started up in order to enable communication. The second supply network 56, 57 is then activated in order to supply the loads 84, 85, the logic circuit 69 being supplied only via the second supply network 56, 57 from this time on and the first supply network 45, 46 supplying only the DC-isolated region 82, that is to say the communication circuit 70, in particular.

During the starting operation, there is no voltage difference or only a very small voltage difference between the ground lines 46, 57 since both are connected to the negative pole of the battery 59 without interruption in the normal case. If the ground line 57 is now isolated on account of a line interruption in the ground line 57 of the second supply network 56, 57 between the application 79 and the tractor 42 (scenario b)), a voltage difference will be established between the ground line 57 of the second supply network 56, 57 and the ground line of the first supply network 45, 46 since the ground connection of the second supply network 56, 57 to the connected loads 84, 85 and further control devices (ECUs) is floating on the side of the application 79. This means that any discharge currents of the inductive loads 84, 85 or those from other control devices could now no longer flow via the ground line 57 of the second supply network 56, 57, but rather could flow via the logic circuit 69. In this case, the isolating switch 95 and the second bypass switch 93 should be changed over particularly quickly since otherwise all the currents from all other control devices also flow via the control device 68 to the ground line 46 of the first supply network 45, 46, which may result in this line and the control device 68 being overloaded (which is particularly dangerous).

The voltage difference is determined by the monitoring circuit 96 which then determines that an upper threshold value is exceeded and opens the isolating switch 95. On account of the isolation achieved thereby, the logic circuit 69 is now no longer actively supplied since the internal ground line 94 of the control unit 68 is now also floating. At best, the logic circuit 69 can be supplied for a certain time via buffer capacitances of the central supply circuit 71, the ground connection being established via the functional ground 86 of the control unit 68. The monitoring circuit 96 therefore closes the second bypass switch 93 at the same time or with a short delay. The power outputs of the control unit 68 to the loads 84, 85 are likewise intended to be deactivated at the same time in order to prevent an excessive current through the ground line of the first supply network. During these switching operations, communication is also maintained and remains via the network connection 80.

The internal ground line 94 of the control unit is now connected to the ground line 46 of the first supply network 45, 46. This state is retained as long as the voltage difference is present (at least for a certain time). At certain intervals of time, the monitoring circuit 96 checks whether a voltage difference still exists; if this is the case, nothing changes in the configuration of the switches 93, 95. However, if the voltage difference falls below a lower threshold value (at least for a certain time), the original switch configuration is restored by the monitoring circuit 96, that is to say the second bypass switch 93 is opened and the isolating switch 95 is closed and the ground supply of the logic circuit 69 is effected in the same manner as before the interruption.

Optionally, the first bypass switch 77 can also be closed during such a fault, with the result that the logic circuit 69 is completely supplied via the first supply network 45, 46.

If the grounds are locally isolated on account of a line interruption between the control unit 68 and the ground connection 57 of the second supply network 56, 57 in the cable harness of the application 79 (scenario a)), a voltage difference will likewise be established between the ground line 46 of the first supply network 45, 46 and the internal ground line 94 which is only connected to the insulated, isolated ground of the second supply network 56, 57 since the internal ground line 94 and the functional ground 86 are suddenly floating on the side of the control unit 68 as a result of the interruption. On account of this isolation, the logic circuit 69 is now no longer actively supplied and, at best, buffer capacitances of the central supply circuit 71 can again provide the supply for a certain time. The monitoring circuit 96 will then become active in the manner described above, with the result that the isolating switch 95 and the second bypass switch 93 and optionally the first bypass switch 77 are controlled in the same manner as in scenario b) described above.

Figure 7:
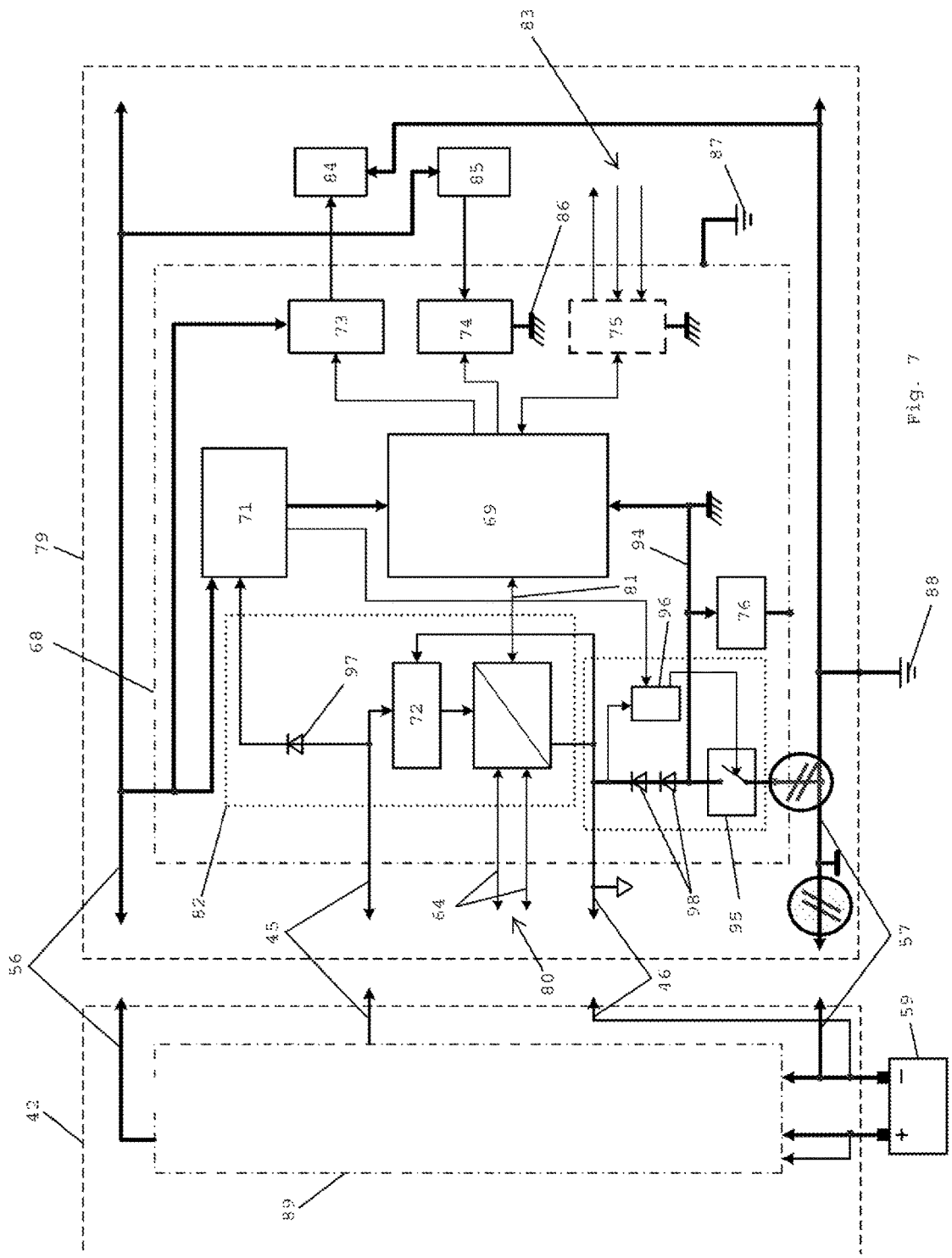
FIG. 7 shows a schematic block diagram of an alternative control unit with protection of the logic circuit from discharge currents and for maintaining the supply for communication if the ground connections of a supply network are interrupted.

The control electronics schematically illustrated in FIG. 7 largely correspond to the variant shown in FIG. 6, with the result that only the differences are discussed below and reference is made to the detailed description above with regard to the correspondences.

Instead of the first bypass switch 77, a first bridging diode 97 is connected to the supply line 45 of the first supply network 45, 46 of the tractor 42 in this variant and is set up to supply the logic circuit 69 with current from the first supply network 45, 46 if the voltage between the supply lines 45, 56 of the two supply networks 45, 46, 56, 57 exceeds a forward voltage of the first bridging diode 97. In this case, the first bridging diode 97 is arranged in the direction of the central supply circuit 71 in the forward direction from the supply line 45 of the first supply network 45, 46. The first bridging diode 97 supplies the central supply circuit 71 with voltage via the first supply network 45, 46 as soon as the forward voltage of the first bridging diode 97 is reached. In the zero-voltage state of the control unit 68, which is required in a conformity measurement, the measurement voltage is at most 200 mV. In order to block a parasitic path between the ground lines 46, 57 of the two supply networks 45, 46, 56, 57 via the components of the control electronics, it is favorable if the forward voltage of the first bridging diode 97 is approximately 0.7 V above a predefined or likely measurement voltage (for example 200 mV), for example, with the result that the bridging diode 97 does not turn on and the required isolation impedance is complied with.

Assuming that the two ground lines 46, 57 of the first supply network 45, 46 and of the second supply network 56, 57 have substantially the same potential (since both grounds are generally connected to the battery 59) during normal operation (that is to say apart from one of the faults described above), the second bypass switch 93 can be replaced with two second bridging diodes 98 connected in series. In this case, the second bridging diodes 98 are arranged in the forward direction from the internal ground line 94 to the ground line 46 of the first supply network 45, 46.

In the event of an interruption in the ground line 57, as described above, the internal ground line 94 of the logic circuit 69 is also then initially floating. Assuming that the internal ground line 94 can only become positive with respect to the ground line 46 of the first supply network 45, 46, one or more second bridging diodes 98 are now inserted between these two ground lines 94, 46, which bridging diodes turn on when the voltage difference exceeds a certain value. In the normal case (that is to say during normal operation outside a fault), the voltage difference must remain smaller than the total forward voltage of the second bridging diodes 98 (for example 2.1 V in the case of three diodes each with a forward voltage of 0.7 V) in order to avoid incorrect connection (for example because the measurement voltage is 200 mV in the conformity measurements). If, for example in the event of a fault, the forward voltage of the second bridging diodes 98 is reached by the potential difference between the ground lines 94, 46, the diodes turn on and the monitoring circuit 96 detects this, for example on the basis of the current by means of a voltage measurement at a shunt resistor (not shown or schematically illustrated in a simplified manner with only one connection). In order to prevent a relatively long short circuit between the two ground lines 46, 57 of the supply networks 45, 46, 56, 57 and to prevent overloading of the ground line 46 of the first supply network 45, 46, the isolating switch 95 is opened in the event of a fault, as already described in connection with FIG. 6. The driver circuits 73, 74 of the control unit 68 are therefore no longer supplied and substantially the same supply conditions as in the embodiment with switches according to FIG. 6 prevail. However, a difference from FIG. 6 is that no voltage difference between the ground lines 46, 57 is measured in this state using the monitoring circuit 96, but rather the current via the bridging diodes 98 is measured via a shunt resistor in series with the second bridging diodes 98.

In order to detect the end of the interruption in the ground line 57 in this situation, the isolating switch 95 is closed by the monitoring circuit 96 at periodic intervals and a current measurement is used to check whether a certain current (that is to say corresponding to a lower threshold value) flows and a defined upper threshold value is not exceeded. If the upper threshold value is exceeded because an additional load current flows on account of the still existing interruption in the ground line 57 of the second supply network 56, 57, the protected state remains and the isolating switch 95 remains open (or is opened again after the measurement); if the lower threshold is undershot or a current no longer flows at all, for instance because the interruption in the ground line 57 has been eliminated and therefore there is no voltage difference between the ground lines 46, 57 of the supply networks 45, 46, 56, 57, the isolating switch 95 is permanently closed again and the initial state is restored.

The invention claimed is:

1. Control electronics for an agricultural or forestry vehicle or an agricultural or forestry machine, the control electronics comprising: power connections at least for a first supply network and a second supply network;
   at least one network connection;
   a communication circuit configured to transmit data via the network connection and configured to be supplied via the first supply network;
   a logic circuit coupled to the communication circuit, the logic circuit comprising at least one control output for controlling an electrical load supplied via the second supply network, the logic circuit being connected to the second supply network via an internal supply line and an internal ground line, the logic circuit configured to be electrically supplied via the second supply network; and
   an isolating switch arranged in the internal supply line or the internal ground line of the logic circuit and configured to interrupt the respective internal supply line or internal ground line of the logic circuit if the second supply network is interrupted,
   wherein at least one first bridging element is connected to the first supply network and to the second supply network and is configured to at least temporarily connect the two supply networks, the first bridging element being substantially electrically insulating in an off state and being substantially electrically conductive in an on state, the two supply networks having at least a stipulated minimum isolation impedance in the off state of the first bridging element.

2. The control electronics as claimed in claim 1, wherein the isolating switch is arranged in the internal ground line which connects the logic circuit to a ground line of the second supply network.

3. The control electronics as claimed in claim 2, wherein the isolating switch is controllably connected to a monitoring circuit, the monitoring circuit configured to determine a voltage difference between the ground lines of the two supply networks and to control the isolating switch to open upon a determined voltage difference exceeding a predefined upper threshold value.

4. The control electronics as claimed in claim 1, wherein the logic circuit is configured to be temporarily electrically supplied via the first supply network.

5. The control electronics as claimed in claim 1, wherein the first bridging element is a first bypass switch, the off state being a switched-off or open state of the first bypass switch.

6. The control electronics as claimed in claim 1, wherein the first bridging element comprises at least one first bridging diode and the off state of the first bridging element corresponds to operation of the at least one first bridging diode in the reverse direction, the first bridging diode connecting the first supply network to the second supply network in the forward direction.

7. The control electronics as claimed in claim 1, wherein the first bridging element connects a supply line of the first supply network to a supply line of the second supply network.

8. The control electronics as claimed in claim 7, wherein a second bridging element is connected to a ground line of the first supply network and to the internal ground line and is configured to at least temporarily connect the two ground lines, the second bridging element being substantially electrically insulating in an off state and being substantially electrically conductive in an on state.

9. The control electronics as claimed in claim 8, wherein the second bridging element is a second bypass switch, the off state being a switched-off or open state of the second bypass switch.

10. The control electronics as claimed in claim 9, wherein the isolating switch is controllably connected to a monitoring circuit, the monitoring circuit configured to determine a voltage difference between the ground lines of the two supply networks and to control the isolating switch to open upon a determined voltage difference exceeding a predefined upper threshold value; and
    wherein the second bypass switch is controllably connected to the monitoring circuit and is configured to control the second bypass switch to close as soon as the determined voltage difference exceeds a predefined upper threshold value.

11. The control electronics as claimed in claim 8, wherein the second bridging element comprises at least one second bridging diode and the off state of the second bridging element corresponds to operation of the at least one second bridging diode in the reverse direction, the second bridging diode connecting the internal ground line to the first supply network in the forward direction.

12. The control electronics as claimed in claim 8, wherein the two supply networks have at least a stipulated minimum isolation impedance in an off state of the two bridging elements.

13. The control electronics as claimed in claim 3, wherein the logic circuit is configured to be temporarily supplied via the first supply network;
    wherein at least one first bridging element is connected to the first supply network and to the second supply network and is configured to at least temporarily connect the two supply networks, the first bridging element being substantially electrically insulating in an off state and being substantially electrically conductive in an on state, the two supply networks having at least a stipulated minimum isolation impedance in the off state of the first bridging element;
    wherein the first bridging element connects a supply line of the first supply network to a supply line of the second supply network; and
    wherein a second bridging element is connected to a ground line of the first supply network and to the internal ground line and is configured to at least temporarily connect the two ground lines, the second bridging element being substantially electrically insulating in an off state and being substantially electrically conductive in an on state.

14. The control electronics as claimed in claim 13, wherein the first bridging element comprises an element selected from the group of:
    a first bypass switch, the off state being a switched-off or open state of the first bypass switch; and
    at least one first bridging diode and the off state of the first bridging element corresponds to operation of the at least one first bridging diode in the reverse direction, the first bridging diode connecting the first supply network to the second supply network in the forward direction.

15. The control electronics as claimed in claim 13, wherein the second bridging element comprises an element selected from the group of:
    a second bypass switch, the off state being a switched-off or open state of the second bypass switch; and
    at least one second bridging diode and the off state of the second bridging element corresponds to operation of the at least one second bridging diode in the reverse direction, the second bridging diode connecting the internal ground line to the first supply network in the forward direction.

16. The control electronics as claimed in claim 13, wherein the first bridging element comprises an element selected from the group of:
    a first bypass switch, the off state being a switched-off or open state of the first bypass switch; and
    at least one first bridging diode and the off state of the first bridging element corresponds to operation of the at least one first bridging diode in the reverse direction, the first bridging diode connecting the first supply network to the second supply network in the forward direction; and
    wherein the second bridging element comprises an element selected from the group of:
    a second bypass switch, the off state being a switched-off or open state of the second bypass switch; and
    at least one second bridging diode and the off state of the second bridging element corresponds to operation of the at least one second bridging diode in the reverse direction, the second bridging diode connecting the internal ground line to the first supply network in the forward direction.

* * * * *